US007844392B2

(12) United States Patent (10) Patent No.: US 7,844,392 B2
Dubourg (45) Date of Patent: Nov. 30, 2010

(54) OPTOELECTRONIC TAXI-ASSISTANCE SAFETY DEVICE FOR AIRCRAFT

(75) Inventor: Bernard Dubourg, Le Haillan (FR)

(73) Assignee: Thales (FR)

( * ) Notice: Subject to any disclaimer, the term of this patent is extended or adjusted under 35 U.S.C. 154(b) by 1136 days.

(21) Appl. No.: 10/590,082

(22) PCT Filed: Feb. 18, 2005

(86) PCT No.: PCT/EP2005/050723

§ 371 (c)(1),
(2), (4) Date: Aug. 21, 2006

(87) PCT Pub. No.: WO2005/093374

PCT Pub. Date: Oct. 6, 2005

(65) Prior Publication Data

US 2007/0168111 A1    Jul. 19, 2007

(30) Foreign Application Priority Data

Feb. 27, 2004   (FR) ................................. 04 02034

(51) Int. Cl.
*G06F 19/00* (2006.01)
(52) U.S. Cl. ........................................ 701/120; 340/960
(58) Field of Classification Search .................. 701/3, 701/14–16; 340/960–978, 980
See application file for complete search history.

(56) References Cited

U.S. PATENT DOCUMENTS

| 5,745,863 | A | 4/1998 | Uhlenhop et al. |
| 6,246,342 | B1 * | 6/2001 | Vandevoorde et al. ........ 340/961 |
| 6,272,404 | B1 * | 8/2001 | Amano et al. ................... 701/3 |
| 6,405,975 | B1 * | 6/2002 | Sankrithi et al. ............ 244/1 R |
| 6,411,890 | B1 | 6/2002 | Zimmerman |
| 6,571,166 | B1 * | 5/2003 | Johnson et al. ............. 701/120 |
| 6,731,226 | B2 * | 5/2004 | Walter ........................ 340/972 |
| 2003/0102987 | A1 | 6/2003 | Walter |

FOREIGN PATENT DOCUMENTS

| WO | 99/04304 A | 1/1999 |
| WO | 9904304 A | 1/1999 |

* cited by examiner

*Primary Examiner*—Dalena Tran
(74) *Attorney, Agent, or Firm*—Lowe Hauptman Ham & Berner, LLP

(57) ABSTRACT

The field of the invention is that of optoelectronic taxi-assistance devices for aircraft, including a head-up display providing for the presentation of information in the pilot's field of vision. The invention applies in particular to large civil aircraft of the Boeing 747 or Airbus A380 type. The object of the invention is to propose the displaying of safety-related symbologies in the head-up display, providing for substantially improving aircraft safety and maneuverability during the taxiing phase. These symbologies relate substantially to the position of the aircraft on the taxiway and to the turning and stop maneuvers to be performed by the pilot. Said symbologies are particularly useful in poor visibility conditions.

12 Claims, 6 Drawing Sheets

OPTOELECTRONIC TAXI-ASSISTANCE SAFETY DEVICE FOR AIRCRAFT

BACKGROUND OF THE INVENTION

1. Field of the Invention

The field of the invention is that of optoelectronic taxi-assistance devices for aircraft, including a head-up display providing for the presentation of information in the pilot's field of vision. The invention applies in particular to large civil aircraft of the Boding 747 or Airbus A380 type.

2. Description of the Prior Art

It is important that the taxiing phases of aircraft in an airport are able to take place in complete safety regardless of the air traffic density or the visibility conditions.

On modern aircraft, to provide the airport navigation function, there are two types of navigation aid systems. These are:
- a navigation aid system comprising in particular an instrument panel display, called a head-down display, presenting an electronic map of the airport, of the position of the aircraft in the airport and of the path to be followed, and including taxi clearance management;
- a taxi-assistance system comprising in particular a head-up display presenting superimposed on the external landscape a symbology giving information on the path to be followed and a certain number of instructions, said symbology being generated by a computer dedicated to the head-up display.

In the case of the taxi-assistance system, the information is supplied to the computer 2 of the head-up display 1, as shown in FIG. 1:
- by the main navigation system 3, in particular for heading, ground speed and position information;
- by the computer 4 dedicated to the airport navigation function, in particular for information relating to the path to be followed, to stop points, to taxiway changes, to the distance to be covered or to the width of the taxiway.

The computer combines the specific calculation functions from the information supplied to it and generates the symbology required for the head-up display.

A head-up display comprises an image source, collimating optics and an optical combiner placed in the field of vision of the pilot 5; the head-up display thus gives a virtual image at infinity of the symbology superimposed on the external landscape.

Conventionally, the symbols displayed in a head-up display are separated into two major categories:
- "2D" symbols providing navigation information to the pilot, for example:
  - the horizon line;
  - the estimated time or the distance of the aircraft to the final waypoint;
  - the change of direction to be performed;
  - the ground speed of the aircraft;
  - the magnetic heading;
- "3D" symbols which give a better perception of the surroundings of the aircraft. These symbols are particularly useful in poor visibility conditions, for example during nighttime navigation or when navigating in bad weather conditions. These are substantially symbols representing the taxiway. The virtual image of this symbology provided by the head-up display is superimposed exactly on the real position of the taxiway, the position of the aircraft relative to the taxiway being known exactly by means of the navigation systems.

By way of non-limiting example, FIG. 2 represents a symbology of this type as is presented to the pilot through the head-up display. It comprises:
- the horizon line 10 graduated in magnetic headings (values 31 and 33 in the figure, representing the value of the heading in tens of degrees);
- the estimated time or the distance of the aircraft to the final waypoint 11 symbolized by the text "HOLD" followed by a number of minutes indicating to the pilot the number of minutes remaining until the final waypoint (2 minutes in FIG. 2). The time indication can be replaced by a distance indication generally expressed in meters;
- the change of direction 12 symbolized by the text "TURN" followed by an indication of the number of meters to be covered before the next turn of the aircraft (91 meters in FIG. 2);
- the magnetic heading indication 13 symbolized by the value of the magnetic heading surrounded by a rectangle terminated by a V-shaped point arranged on the horizon line 10 (value of the heading in FIG. 2: 322 degrees);
- the ground speed 14 symbolized by the text GS followed by the value of the speed expressed in knots, the acronym GS standing for "Ground Speed". When the speed is excessive (as in FIG. 2), the symbol is drawn in reverse video (in white on a black background in FIG. 2);
- the symbols corresponding to the taxiway, their image through the head-up display being superimposed perfectly with the real taxiway. These symbols comprise:
  - blocks 15 arranged at regular intervals and symbolizing the right and left limits of the taxiway. In FIG. 2, these blocks are circular but, naturally, appear elliptical due to the perspective effect, their size decreasing with their distance to the aircraft;
  - rectangles 16 arranged at regular intervals and symbolizing the middle of the taxiway. Naturally, these rectangles are also represented in perspective, their orientation and their size depending on their position relative to the aircraft.

The main drawback of this type of symbology is that the information supplied does not present specific symbologies intended to make safe the taxiing of the aircraft on the taxiways. This problem is particularly significant for large capacity civil airplanes which, since they have large dimensions, must be maneuvered with greater precision than smaller airplanes. The location of the pilot, placed very high above the ground, also necessitates adapted symbologies. For example, on an airbus A380, the pilot is placed more than seven meters above the ground.

SUMMARY OF THE INVENTION

The object of the invention is to propose safety-related symbologies providing for substantially improving aircraft safety and maneuverability during the taxiing phase.

More specifically, a subject of the invention is an optoelectronic taxi-assistance device for aircraft in an airport, said device comprising at least:
- a head-up display;
- a computer dedicated to said head-up display; characterized in that said computer includes means for displaying on the head-up display safety symbols concerning either the position of the aircraft on the airport taxiways or the maneuver to be performed by the aircraft on said taxiways.

Advantageously, if the aircraft turns, the safety symbols include an arrow of variable size, the length of the arrow being maximum when entering the turn and zero when coming out of the turn. The safety symbols also include, on both sides of the arrow, a first indication relating to the taxiway on which the aircraft is located before the turn and a second indication relating to the taxiway located on coming out of the turn.

Advantageously, the safety symbols include a first symbol representing the width of the taxiway and a second symbol representing the width of the main landing gear, the widths of the first symbol and of the second symbol being represented with the same scale, the position of the second symbol relative to the first symbol being representative of the real position of the landing gear on the taxiway. Advantageously, the first symbol is a rectangle including a central bar symbolizing the axis of the taxiway and the second symbol is composed of two oblong shapes. Advantageously, the safety symbols also include, on both sides of the first symbol, two alarm symbols which flash when the landing gear is very close to the edge of the taxiway, the second safety symbol also flashing in this situation.

Advantageously, the safety symbols include an arresting barrier, said arresting barrier occupying a precise and constant virtual position on an airport taxiway. The arresting barrier includes at least one stand surmounted by a grille composed of inclined and parallel bars between two horizontal bars. Advantageously, the safety symbols also include at least a first stop indicator and an indication of the distance separating the aircraft from the virtual position of the arresting barrier. Advantageously, the safety symbols also include at least a first and a second stop indicator flashing when the distance separating the aircraft from the virtual position of the arresting barrier is less than a set value; the stop indicators are, for example, the word "STOP" and can be displayed in reverse video.

BRIEF DESCRIPTION OF THE DRAWINGS

The invention will be better understood and other advantages will become clear on reading the following description given on a non-limiting basis and with reference to the accompanying figures in which.

MORE DETAILED DESCRIPTION

If the aircraft turns, it is important that the pilot is totally clear about the position of the aircraft before, during and after the turn. A first symbology according to the invention facilitates these different phases. It includes an arrow of variable size, the length of the arrow being maximum when entering the turn and zero when coming out of the turn. The safety symbols also include, on both sides of the arrow, a first indication relating to the taxiway on which the aircraft is located before the turn and a second indication relating to the taxiway on coming out of the turn.

Figure 1:
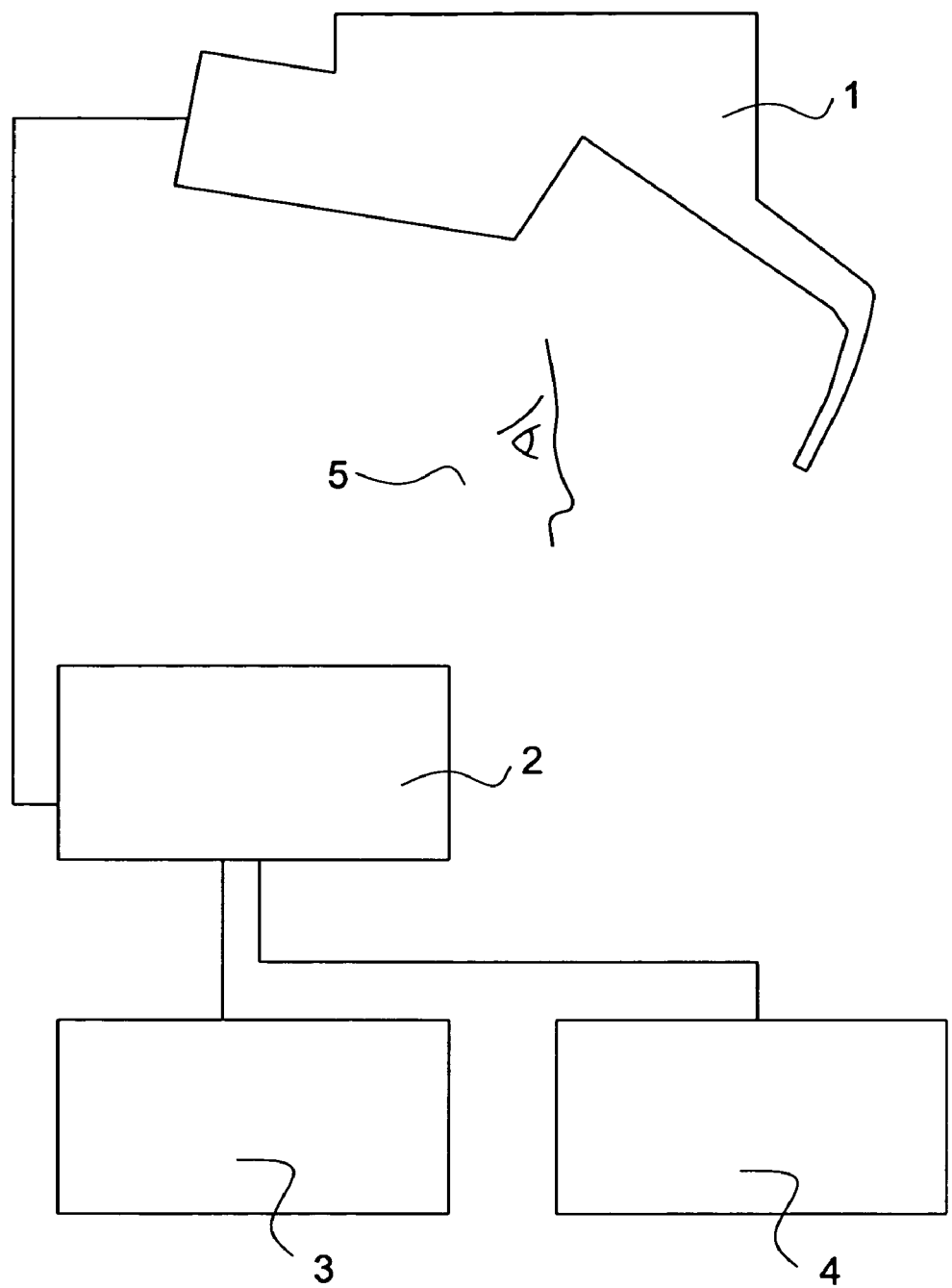
FIG. 1 represents the general block diagram of an opto-electronic taxi-assistance device for aircraft.
Figure 2:
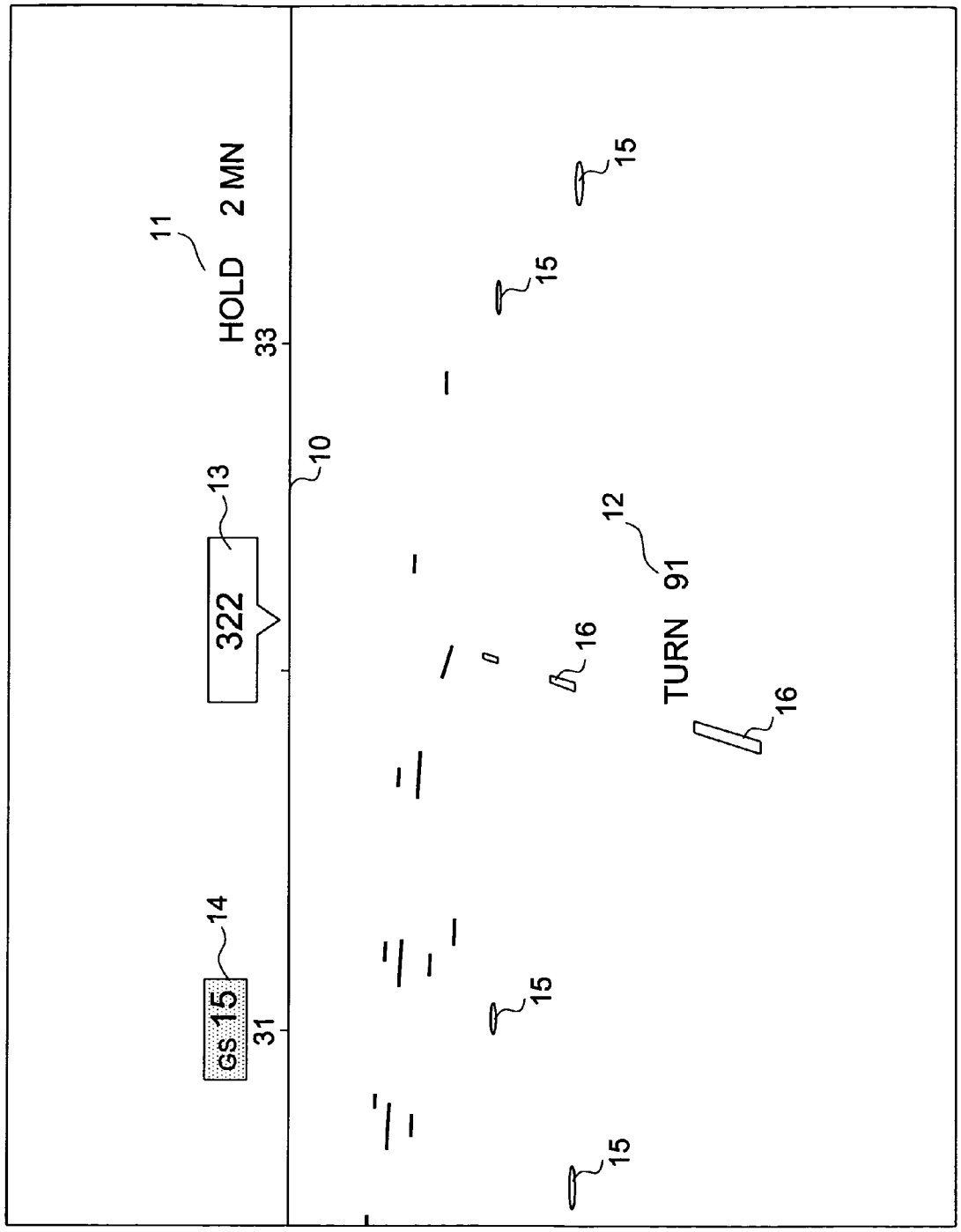
FIG. 2 represents a taxi-assistance symbology according to the prior art.
Figure 3:
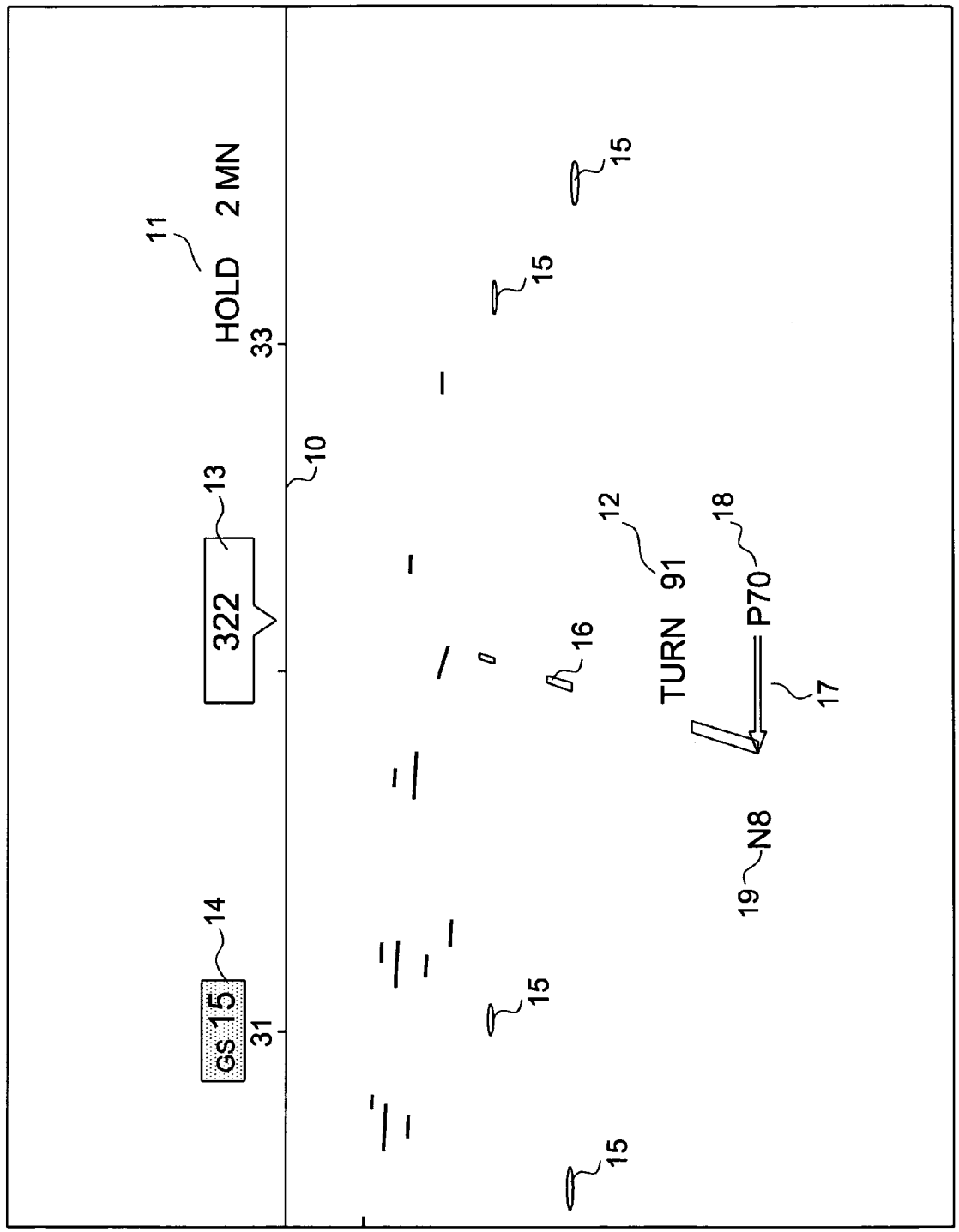
FIG. 3 represents a taxi-assistance symbology comprising symbols according to the invention which are dedicated to turning maneuvers.

By way of example, FIG. 3 illustrates this type of symbology. It comprises all the symbols of FIG. 2 to which specific symbols 17, 18 and 19 according to the invention have been added.

The symbol 17 is an arrow. Its direction corresponds to the sense of the turn and its size corresponds to the position of the aircraft in the turn. In the case of the figure, the aircraft is going to enter the turn, and the size of the arrow is maximum.

The symbols 18 and 19 represent, on the one hand, the taxiway on which the aircraft is located, i.e. taxiway P70 in FIG. 3, and, on the other hand, the taxiway on which the aircraft will be located after having performed its turn, i.e. taxiway N8 in FIG. 3.

As the aircraft progresses in the turn, the size of the arrow decreases until it completely disappears on coming out of the turn. In that case, only the indication of the taxiway on which the aircraft is now located remains displayed.

A second symbology according to the invention provides for making safe the position of the aircraft on the taxiway and in particular the position of the landing gear. Specifically, large-capacity airplanes have very wide landing gear which may come close to the width of the taxiway. It is therefore essential to have complete control over the position of the aircraft on the taxiway so as to avoid any maneuvering off track.

This symbology comprises:
 a first symbol representing the width of the taxiway,
 a second symbol representing the width of the main landing gear,
 the widths of the first symbol and of the second symbol being represented with the same scale, the position of the second symbol relative to the first symbol being representative of the real position of the landing gear on the taxiway. Advantageously, the first symbol is a rectangle including a central bar symbolizing the axis of the taxiway and the second symbol is composed of two oblong shapes symbolizing wheels. Advantageously, the safety symbols also include, on both sides of the first symbol, two alarm symbols which flash when the landing gear is very close to the edge of the taxiway.

Figure 4:
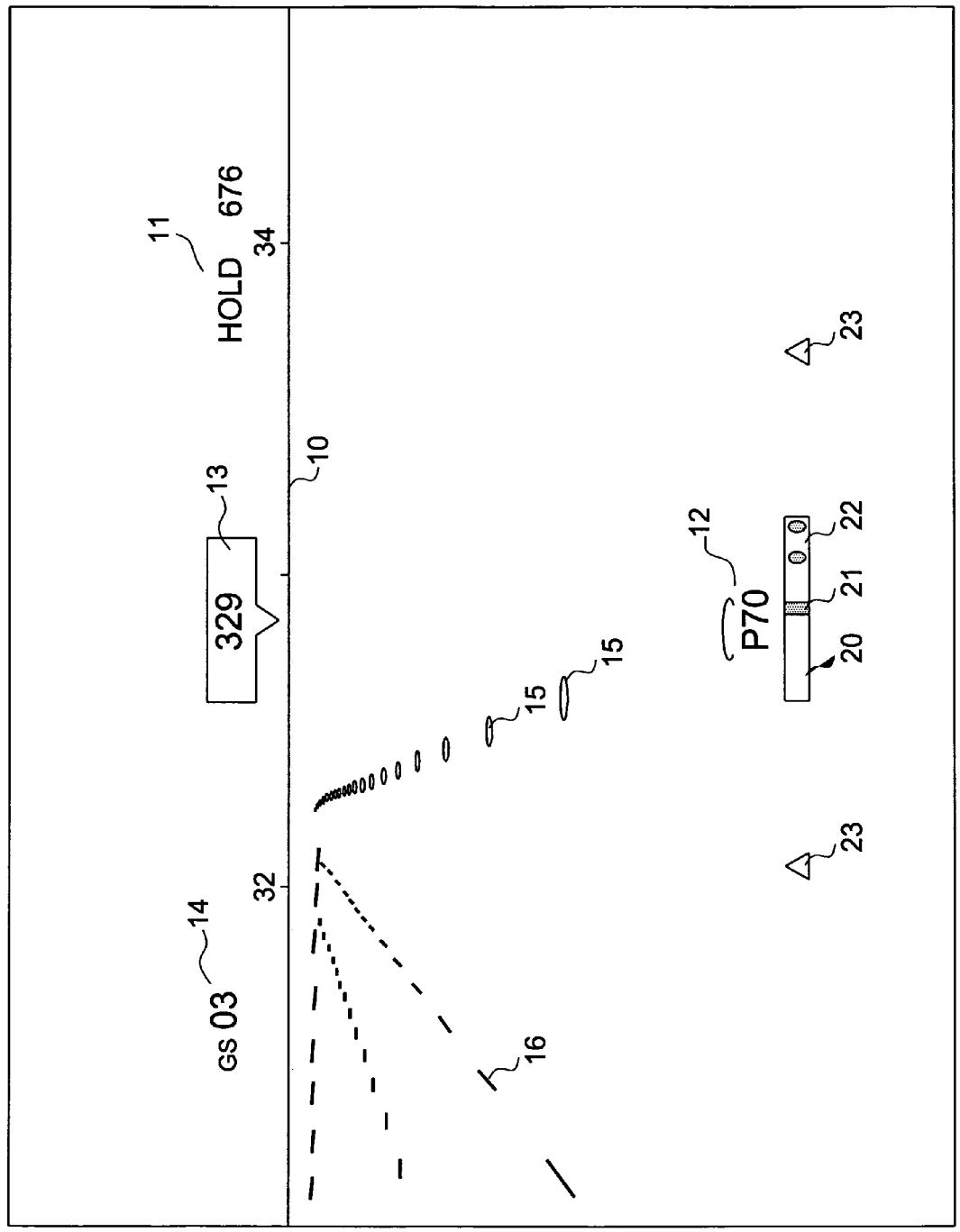
FIG. 4 represents a taxi-assistance symbology comprising symbols according to the invention which are dedicated to the position of the aircraft on the runway.

By way of example, FIG. 4 illustrates this symbology. It includes some of the symbols of FIGS. 2 and 3 to which the specific symbols according to the invention have been added. Thus, the following are featured: the horizon line 10 graduated in magnetic headings (values 32 and 34 in FIG. 4); the estimated distance of the aircraft to the final waypoint 11 symbolized by the text "HOLD 676" indicating that the aircraft is still 676 meters from the final point; the taxiway indication 12 indicating that the aircraft is on taxiway P70; the magnetic heading indication 13 (value of the heading in FIG. 4: 329 degrees); the ground speed 14 symbolized by the text "GS 03"; the symbols corresponding to the taxiway which are the blocks 15 and the central rectangles 16 arranged at regular intervals and symbolizing the middle of the taxiway.

The specific symbols are:
 a rectangle 20 including a central bar 21 symbolizing the axis of the taxiway;
 a symbol 22 composed of two oblong shapes symbolizing the landing gear;
 two triangular alarm symbols 23 arranged on both sides of the symbol 20.

In the case of FIG. 4, the landing gear is too close to one of the edges of the taxiway. The symbol 22 is off-centered with respect to the rectangle 20. The alarm symbols 23 are hence flashing as is the symbol 22.

A third symbology according to the invention provides for making safe the stop maneuvers of the aircraft. It includes:

an arresting barrier, said arresting barrier occupying a precise and constant virtual position on an airport taxiway. The arresting barrier includes at least one stand surmounted by a grille composed of inclined and parallel bars between two horizontal bars;

a first stop indicator and an indication of the distance separating the aircraft from the virtual position of the arresting barrier;

a second stop indicator, the first and the second stop indicator flashing when the distance separating the aircraft from the virtual position of the arresting barrier is less than a set value. The stop indicators are, for example, the word "STOP" and can be displayed in reverse video.

Figure 5:
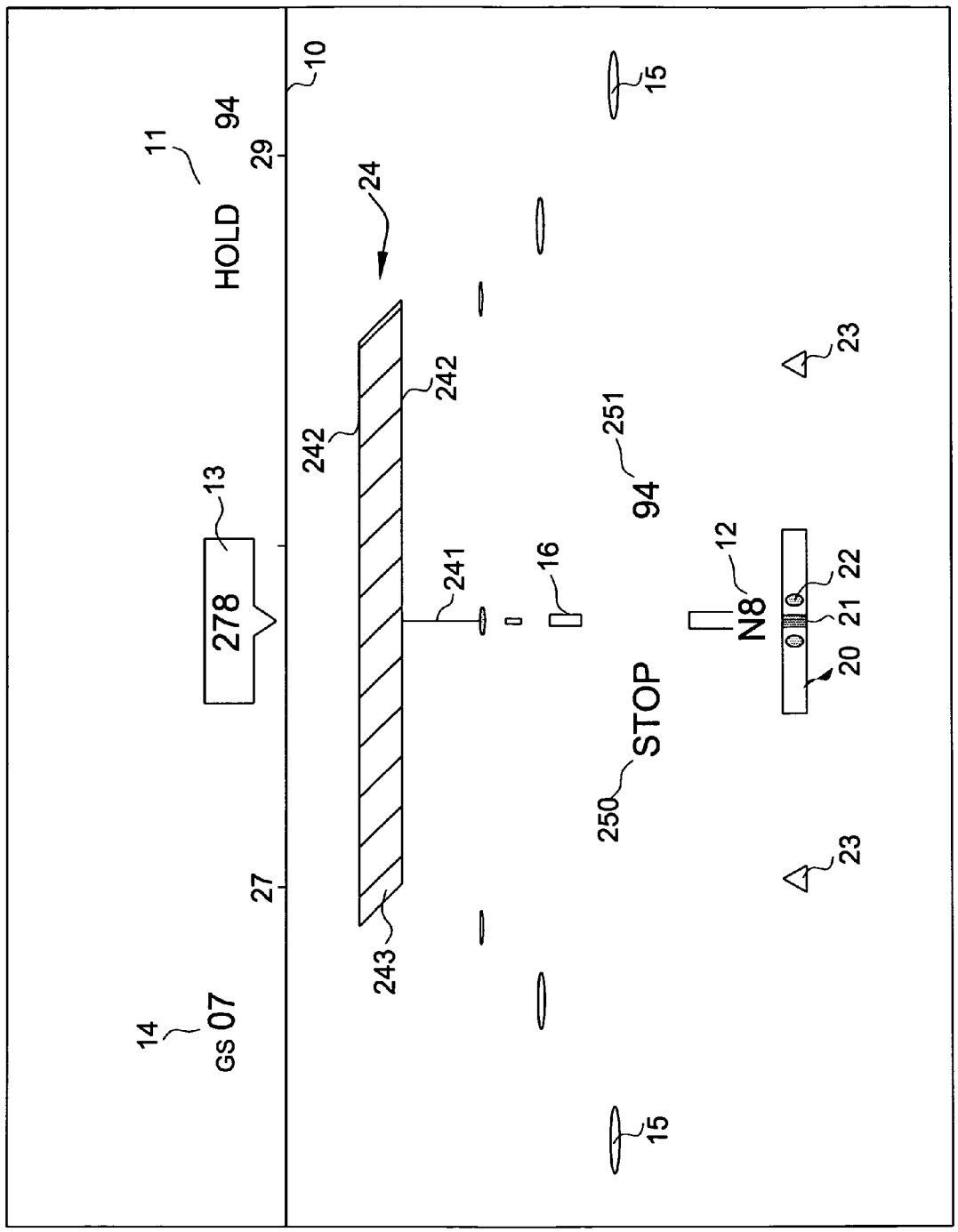
FIG. 5 represents a taxi-assistance symbology comprising symbols according to the invention which are dedicated to stopping the aircraft at a given stop point.
Figure 6:
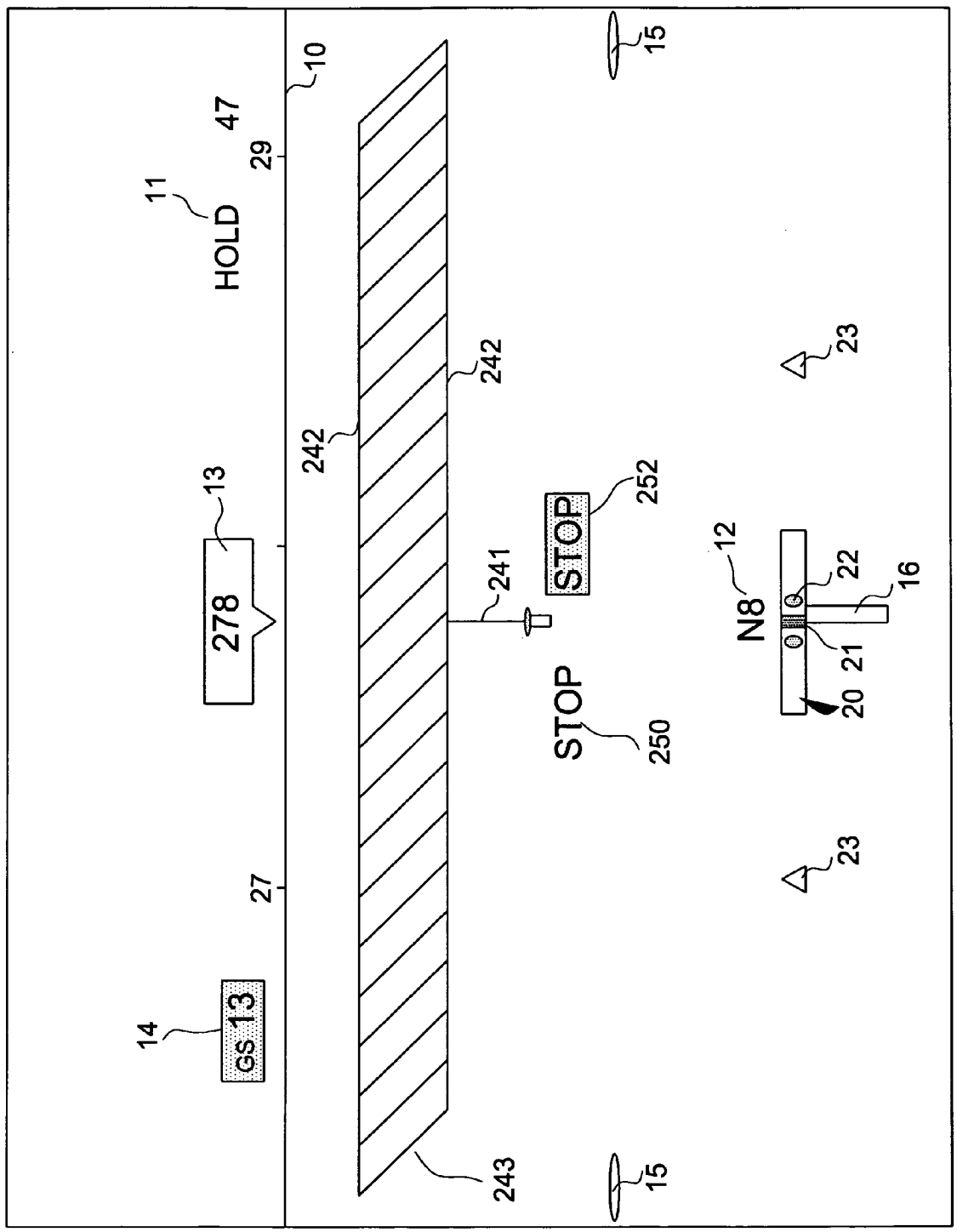
FIG. 6 represents the same symbology as in FIG. 5 when the aircraft is near the stop point.

By way of example, FIGS. 5 and 6 illustrate this symbology. FIG. 5 contains some symbols from the previous figures to which the specific symbols according to the invention have been added. Thus, the following are featured: the horizon line 10 graduated in magnetic headings (values 27 and 29 in FIG. 5); the estimated distance of the aircraft to the final waypoint 11 symbolized by the text "HOLD 94" indicating that the aircraft is still 94 meters from the final point; the magnetic heading indication 13 (value of the heading in FIG. 5: 278 degrees); the ground speed 14 symbolized by the text "GS 07"; the taxiway indication 12 indicating that the aircraft is on the taxiway N8; the symbols corresponding to the taxiway which are the blocks 15 and the central rectangles 16; the symbols 20, 21, 22 and 23 representing the position of the landing gear on the taxiway.

The specific symbols are:

the arresting barrier 24 composed of a central stand 241, a grille 243 composed of inclined bars and two horizontal bars 242. The width of the barrier is substantially equal to the width of the taxiway;

a stop indicator 250 comprising the word "STOP" followed by an indication 251 of the distance separating the aircraft from the virtual position of the arresting barrier, in this case 94 meters in FIG. 5.

The ergonomics of this barrier is particularly well suited to large aircraft. Specifically, by arranging the grille on a stand, the image of the grille is brought into the central field of vision of the pilot, which pilot is located at a significant height above the ground.

In the case of FIG. 5, the aircraft is still 94 meters from the barrier and the safety of the aircraft is still assured. FIG. 6 represents a typical symbology for a situation in which the aircraft is very near the barrier. In that case, the stop indicator changes.

In FIG. 6, the following are featured: the horizon line 10 graduated in magnetic headings (values 27 and 29 in FIG. 6); the estimated distance of the aircraft to the final waypoint 11 symbolized by the text "HOLD 47" indicating that the aircraft is no more than 47 meters from the barrier; the magnetic heading indication 13 (value of the heading in FIG. 6: 278 degrees); the ground speed 14 symbolized by the text "GS 13" in reverse video because the speed of the aircraft is excessive; the taxiway indication 12 indicating that the aircraft is on the taxiway N8; the symbols corresponding to the taxiway which are the blocks 15 and the central rectangles 16; the symbols 20, 21, 22 and 23 representing the position of the landing gear on the taxiway; the symbols 241, 242, 243 symbolizing the arresting barrier. The symbology also includes two stop indicators 250 and 252 symbolized by the word "STOP" which are drawn in reverse video and which flash, indicating to the pilot that he must proceed to an immediate stop of the aircraft, the distance separating the aircraft from the barrier not being more than 47 meters.

The invention claimed is:

1. An optoelectronic taxi-assistance device for an aircraft in an airport, said device comprising:
a head-up display and a computer dedicated to said head-up display, said computer including means for displaying on the head-up display safety symbols concerning either the position of the aircraft on the airport taxiways or the maneuver to be performed by the aircraft on said taxiways, and if the aircraft makes a turn, the safety symbols include an arrow of variable size, the length of the arrow is maximum when entering the turn and zero when coming out of the turn.

2. The device as claimed in claim 1, wherein the safety symbols also include, on both sides of the arrow, a first indication relating to the taxiway on which the aircraft is located before the turn and a second indication relating to the taxiway located on coming out of the turn.

3. The device as claimed in claim 1, wherein the safety symbols include a first symbol representing the width of the taxiway and a second symbol representing the width of the main landing gear, the widths of the first symbol and of the second symbol being represented with the same scale, the position of the second symbol relative to the first symbol being representative of the real position of the landing gear on the taxiway.

4. The device as claimed in claim 3, wherein the first symbol is a rectangle including a central bar symbolizing the axis of the taxiway and the second symbol is composed of two oblong shapes.

5. The device as claimed in claim 3, wherein the safety symbols also include, on both sides of the first symbol, two alarm symbols which flash when the landing gear is very close to the edge of the taxiway.

6. The device as claimed in claim 3, wherein the second safety symbol flashes when the landing gear is very close to the edge of the taxiway.

7. The device as claimed in claim 1, wherein the safety symbols include an arresting barrier, said arresting barrier occupying a precise and constant virtual position on an airport taxiway.

8. The device as claimed in claim 7, wherein the arresting barrier includes at least one stand surmounted by a grille composed of inclined and parallel bars between two horizontal bars.

9. The device as claimed in claim 7, wherein the safety symbols also include at least a first stop indicator and an indication of the distance separating the aircraft from the virtual position of the arresting barrier.

10. The device as claimed in claim 9, wherein the stop indicators are the word STOP.

11. The device as claimed in claim 9, wherein the stop indicators are displayed in reverse video.

12. The device as claimed in claim 7, wherein the safety symbols also include at least a first and a second stop indicator flashing when the distance separating the aircraft from the virtual position of the arresting barrier is less than a set value.

* * * * *